March 21, 1961     H. SEIDEL     2,976,492
SOLID STATE MASER
Filed Dec. 31, 1956     2 Sheets-Sheet 1
FIG. 1
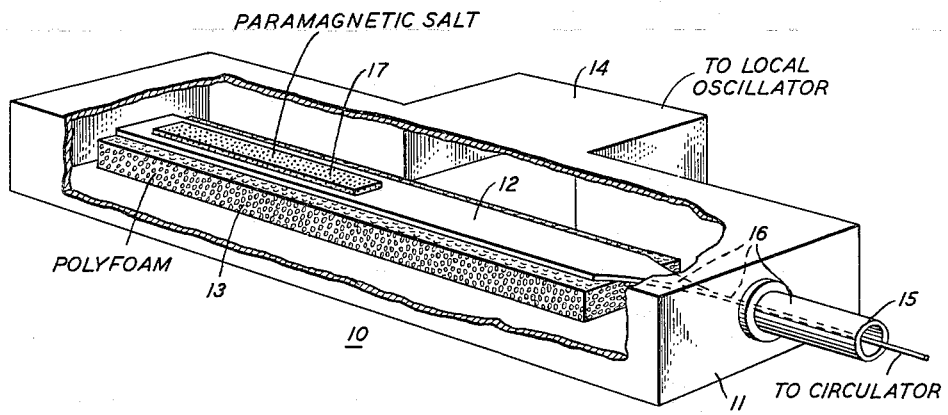
FIG. 2A     FIG. 2B
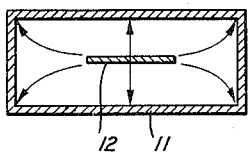 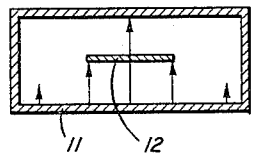
INVENTOR
*H. SEIDEL*
BY
*Arthur J. Torsiglieri*
ATTORNEY March 21, 1961 H. SEIDEL 2,976,492
SOLID STATE MASER Filed Dec. 31, 1956 2 Sheets-Sheet 2

INVENTOR
H. SEIDEL
BY
Arthur J. Torsiglieri
ATTORNEY

United States Patent Office 2,976,492
Patented Mar. 21, 1961

2,976,492
SOLID STATE MASER

Harold Seidel, Plainfield, N.J., assignor to Bell Telephone Laboratories, Incorporated, New York, N.Y., a corporation of New York Filed Dec. 31, 1956, Ser. No. 631,643

1 Claim. (Cl. 330—4)

This invention relates to amplification by stimulated emission of radiation. Apparatus for such amplification is now generally described as a maser.

It is characteristic of a maser that it employs a medium in which there is established at least intermittently a nonequilibrium population distribution in a pair of spaced energy levels of its energy level system. In particular, the population of the higher of the selected pair of energy levels of its energy level system is made larger than that of the lower. It is now usual to describe a medium which is in such a state of nonequilibrium as exhibiting a negative temperature. It is characteristic that if there be applied to a medium which is in a negative temperature state a signal of a frequency which satisfies Bohr's law with respect to the two energy levels which are in nonequilibrium $$\left(\nu = \frac{E_2 - E_1}{h}\right.$$

where $h$ is Planck's constant), then the applied signal will stimulate the emission of radiation at the signal frequency from the medium and the signal will be amplified.

Among the more promising forms of masers known is one which employs as the active material of the negative temperature medium an ionically bound crystalline paramagnetic salt whose energy level system is characterized by at least three spin energy levels with the separations of these three energy levels falling within suitable operating frequency ranges. To this crystal, there is supplied continuously pumping power which effects transitions from the lowest to the highest of the selected three energy levels. By power saturation of the highest energy level whereby the populations of the highest and lowest energy levels are substantially equalized, there is established in one of these two energy levels a nonequilibrium population distribution with respect to the intermediate energy level of the selected three whereby a negative temperature results in the crystal. Thereafter, a signal of appropriate frequency can be amplified by being applied to the crystal. The principles of a maser of this kind are described in more detail in an article in The Physical Review, volume 104, No. 2, pages 324–327, entitled "Proposal for a New Type Solid State Maser," by N. Bloembergen.

In a maser of this kind it becomes important to apply to the medium in convenient fashion signal power and pumping power which are of different frequencies. Moreover, it is desirable to minimize undesirable interaction between the signal power and the pumping power. In one aspect, the invention relates to an arrangement which facilitates the simultaneous application of both pumping power and signal power to the negative temperature medium.

To this end, one feature of the invention comprises a strip line which is made resonant at the signal frequency and on which is positioned the negative temperature medium.

Additionally, in a maser generally, it is advantageous to have the signal power act to stimulate the emission of radiation from the medium for an extended interval of time whereby a higher level of amplification results. In another respect, the invention relates to an arrangement which increases the amplification obtainable by increasing the transit time of the signal through the negative temperature medium.

To this end, another feature of the invention is a distributed slow wave circuit along which the signal wave propagates in coupling relation with the negative temperature medium. In an illustrative embodiment the slow wave circuit is formed by a succession of strip elements coupled to provide a slow group velocity therethrough.

In accordance with still another feature of the invention, the pumping power propagates along its own slow wave circuit in coupling relation with the negative temperature medium whereby there is also increased its transit time through the negative temperature medium.

In an illustrative arrangement embodying each of these distinct features, the negative temperature medium is positioned intermediate two slow wave circuits along one of which propagates the signal power and along the other of which propagates the pumping power and advantageously each of the slow wave circuits is formed by a succession of coupled strip elements. It is to be understood that the various features described can be embodied separately as well as in combination with one another in the practice of the invention.

The principles of the invention will be better understood from the following more detailed discussion taken in conjunction with the accompanying drawings in which:

Fig. 1 shows in a cutaway perspective as an illustrative embodiment of the invention a maser employing a strip line resonant at the signal frequency enclosed within a cavity resonant at the pumping frequency;

Figs. 2A and 2B illustrate the electric field patterns of the signal power and the pumping power, respectively, within the resonant cavity of the maser shown in Fig. 1;

Figure 3:
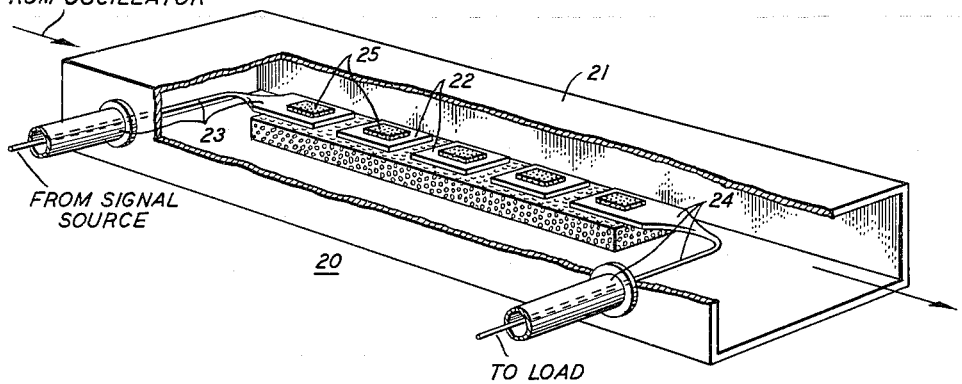
Fig. 3 shows in cutaway perspective an embodiment of the invention in which the signal power propagates along a distributed slow wave circuit within an extended wave guide through which is propagating the pumping power.

In many of the figures of the drawing, in the interest of simplicity it will be advisable to omit a showing of details whose need will be obvious to one skilled in the art.

With reference now more particularly to the drawing, the three level maser 10 shown in Fig. 1 comprises a conductively bounded cavity 11, rectangular in cross section and resonant at the frequency of the power to be used for establishing a negative temperature in the active medium in accordance with known principles. Within the cavity extends a strip conductor 12 which forms with the pair of broad walls of the cavity a strip line, the two walls serving as ground planes. This is one of several forms of strip lines known to workers in the art. The general principles of strip lines are discussed in detail in a special issue of the I.R.E. "Transactions on Microwave Theory and Techniques," volume MTT–3, March 1955, No. 2. In particular, on page 38, there are shown various forms of strip lines including the form used in the embodiment disclosed herein. As shown, the strip conductor is supported by a polyfoam block 13. In particular, the dimensions and geometry of the strip line including the strip conductor 12 are chosen so that the strip line forms a circuit which is resonant at the frequency of the radiation to be stimulated from the negative temperature medium, i.e., the signal frequency.

The pumping power is applied to the resonant cavity 11 from a suitable local oscillator supply (not shown) by a wave guide coupling connection 14 which forms an H plane T with the cavity for exciting the cavity in its dominant T.E. mode. The signal power is applied to the resonant strip line circuit by way of a coaxial line 15. Various strip line-to-coaxial line junctions are described in detail in the aforementioned periodical (see, for example, page 61) and, accordingly, such junction 16 is herein shown schematically in the interest of simplicity. In the embodiment depicted a single coupling connection is shown to the strip line resonant circuit for use both to introduce the input signal power into the circuit and to abstract the output signal power from the circuit. To enable this connection to serve this dual purpose, the coaxial line is connected to a circulator (not shown), in the manner disclosed in the aforementioned Physical Review article. By connecting different arms of a circulator to a signal source, a load, and the coupling connection of the maser, it is possible to transmit input power from the signal source selectively to the maser and to transfer output power from the maser selectively to the load. Alternatively, coupling connections may be provided to opposite ends of the strip conductor, of which one then serves as an input connection and the other as an output connection.

The paramagnetic salt which is to serve as the negative temperature medium advantageously is positioned where the magnetic field of the signal power is high. To this end, the paramagnetic medium 17 is centered on the strip conductor, the space adjacent the center of the strip conductor being the region of maximum magnetic field strength.

Various paramagnetic salts are suitable for use as the active material as is described in the aforementioned Physical Review article. Typical salts disclosed therein include nickel fluosilicate diluted in the isomorphous zinc salt and gadolinium ethyl sulphate diluted in the isomorphous lanthanum salt. Moreover, it is advantageous in many instances to use a doped paramagnetic salt, as is described in copending application Serial No. 625,548, filed November 30, 1956, by H. E. D. Scovil. In particular, a suitable negative temperature medium comprises a crystalline paramagnetic salt which is approximately one-half of one percent gadolinium ethyl sulphate, approximately one twentieth of one percent cerium ethyl sulphate and the remainder lanthanum ethyl sulphate.

Still other suitable materials are described in copending application Serial No. 623,648, filed November 1, 1956, by K. D. Bowers. Typical of the materials described therein are the nickel Tutton salts. Each of these latter class of materials is characterized in that at appropriate temperatures there ordinarily exists three discrete energy levels in its energy level system even in the absence of an applied steady magnetic field. Typically, a medium which is one percent $(NH_4)Ni(SO_4)_2 \cdot 6H_2O$ diluted in 99 percent the isomorphous zinc salt $$(NH_4)_2Zn(SO_4)_2 \cdot 6H_2O$$

is useful to amplify a signal of approximately 30 kilomegacycles per second when supplied with pumping power of a frequency of approximatley 74 kilomegacycles per second. On the other hand, materials of the kind described in the aforementioned Physical Review article require an applied steady magnetic field to effect the Zeeman splitting necessary for achieving three discrete energy levels. In particular, for the composite lanthanum ethyl sulphate crystal described above, when a steady magnetic field is applied at an angle of about 73 degrees from the crystalline axis with an intensity of about 3,000 oersteds, a negative temperature at a frequency of about 9.0 kilomegacycles is established by supplying pumping power of about 17.5 kilomegacycles.

In the embodiment depicted, there is not included any provision for providing a steady magnetic field in the paramagnetic salt. However, suitable provision of magnetic flux can readily be made when such flux is required. Moreover, when used, the flux producing apparatus is disposed to provide flux of magnitude and direction suitable for achieving the desired splitting of energy levels in the paramagnetic salt, as is described in the aforementioned Physical Review article.

In Fig. 2A there is shown the electric field pattern associated with the strip line. In the interest of simplicity, the paramagnetic salt has been omitted from each of Figs. 2A and 2B. As is seen, the pattern corresponds to that of a T.E.M. mode in a conventional rectangular wave guide.

In Fig. 2B there is shown the electric field pattern associated with the cavity when it is excited in the T.E. mode dominant in a conventional rectangular wave guide.

It can be appreciated by a worker in the art that the two modes depicted will not couple so that operation in each mode is independent. Accordingly, signal power and pumping power may both be applied to the paramagnetic salt without unwanted interference.

It is characteristic of the arrangement described that the magnetic fields associated with the signal power and the pumping power will be parallel to one another in the paramagnetic salt. Accordingly, this arrangement is best adapted for use with a paramagnetic salt in which it is advantageous to have the two magnetic fields in parallel in this fashion. Nickel fluosilicate is a paramagnetic salt of this kind.

Alternatively, by positioning the strip conductor to be parallel to the pair of narrow side walls of the cavity for forming a strip line therewith, there is provided an arangement in which the two electric fields are still such as to permit independent operation while the two magnetic fields are substantially perpendicular to one another in the paramagnetic salt. Such an arrangement is best suited for use with a paramagnetic salt in which the magnetic fields of the pumping power and the signal power are advantageously substantially perpendicular. Gadolinium ethyl sulphate is a paramagnetic salt of this kind. In many cases, it may be advantageous to position the strip conductor at some intremediate angle with respect to the side walls of the cavity. Moreover, the orientation of the applied steady magnetic field can be adjusted to compensate for departures from the optimum relation of the directions of the magnetic fields of the signals power and the pumping power.

In the operation of a maser of this kind in accordance with known maser principles, pumping power of a frequency suitable for establishing a negative temperature in the medium is applied continuously to the cavity and signal power of a frequency corresponding to the separation in the two energy levels between which a negative temperature exists is supplied to the strip line resonant circuit. There becomes available as an output the amplified signal.

Moreover, if the gain is sufficiently high, the maser can be made to oscillate so that an oscillator is provided.

In Fig. 3, there is shown a maser 20 which is characterized by the use of a distributed circuit for providing a slow group velocity for the signal power through the negative temperature medium. In this case, it is advantageous to position the distributed circuit in an open length of wave guide through which is passed continuously pumping power. To this end, in the arrangement shown there is included a wave guide 21, rectangular in cross section, through which is passed continuously pumping power supplied from a local oscillator (not here shown). To minimize the amount of pumping power used, the power not dissipated in one passage through the negative temperature medium may be recirculated for another passage therethrough in a manner to supplement the power being supplied by the local oscillator source.

Within the wave guide 21 there is positioned a succession of strip conductors 22, each forming with the pair of opposite side walls of the wave guide a resonant strip line section. However, adjacent sections of the succession are positioned to be in coupling relation with one another at the signal frequency. Accordingly, at the signal frequency, the succession acts as an array of coupled resonators, which as known to workers in the art has the properties of a distributed slow wave circuit. Typically, the group velocity of the signal wave may be slowed to at least a fifth that in free space. Input signal power is applied to one end of the succession and output signal power is abstracted at the other end, typically by coaxial transitions 23, 24 of the kind previously described. The paramagnetic salt 25 which serves as the negative temperature medium is positioned in the region where the magnetic field of the signal is strong. Advantageously, in this instance the medium comprises a succession of paramagnetic crystals, one associated with each strip conductor. This is advantageous because in the space between strip conductors the magnetic field of the signal is low. However, with slow wave circuits which provide an extended region where the magnetic field of the traveling signal wave is strong, a continuous paramagnetic element may serve as the negative temperature medium.

The basic operation of a maser of this kind is similar to that of a maser of the kind shown in Fig. 1.

Figure 4:
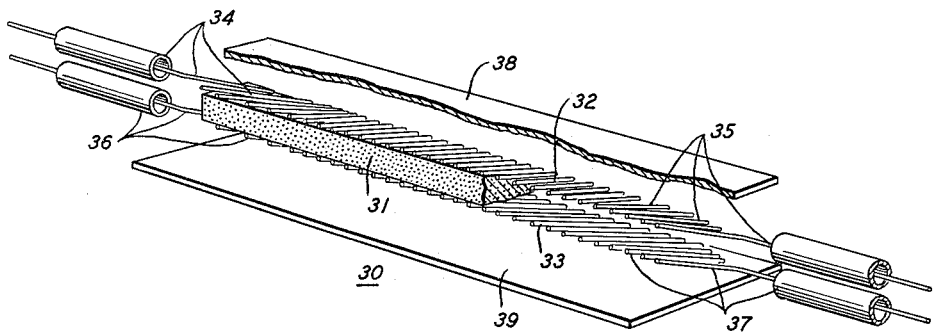
Fig. 4 shows as another illustrative embodiment of the invention a maser which includes for the propagation of wave energy through the negative temperature medium both a distributed slow wave circuit for the pumping power and a distributed slow wave circuit for the signal power.

In the maser 30 shown in Fig. 4, provision is made to slow both the pumping power and the signal power in their travels through the negative temperature medium. In such an arrangement it is important to insure that the magnetic fields of both the pumping power and the signal power will be strong at the regions where the negative temperature medium is positioned.

The arrangement includes an extended negative temperature medium 31 on opposite sides of which are positioned the slow wave circuit 32 along which the pumping power propagates and the slow wave circuit 33 along which the signal power propagates. Each of these slow wave circuits is formed by a succession of strip conductors, each approximately having a length approximately one-half the wavelength of the power to be propagated therealong. In this instance each of the strip conductors is oriented at an acute angle with respect to the longitudinal axis of the negative temperature medium. This insures that a wave launched at one end of the circuit will propagate therealong. The angles the strip conductors of each circuit make with such axis typically will be different for the two circuits. Coupling connections 34, 35, 36, 37 are provided at the two ends of each circuit for introducing and abstracting power. Input signal power is applied to the coupling connection 34 from a suitable signal source and output signal power is abstracted for use by the load by way of coupling connection 35. Pumping power is applied to its slow wave circuit by way of coupling connection 36 and any residual pumping power is abstracted at coupling connection 37, advantageously for reapplication to the coupling connection 37. There is shown schematically a transition region between each end of each circuit and the coupling connection thereto in the form of a region where there occurs a gradual decrease in the angle each strip conductor makes with the longitudinal axis of the negative temperature medium. Of course, other suitable forms of coupling arrangements may be substituted. Moreover, it is feasible to introduce the signal power and pumping powers at different ends of the structure. It is also desirable to position ground planes 38, 39 on opposite sides of the negative temperature medium to minimize the radiation losses of the circuits.

In the arrangement depicted, some interaction may result because of the proximity of the two slow wave circuits. This may be minimized, when this is desirable, by having the planes of the two successions of strip conductors not be parallel. In particular, isolation can be provided by utilizing two strip lines which are at right angles to one another, for example, one having its strip conductors and ground planes each substantially parallel to the vertical plane and the other having its strip conductors and ground planes each substantially parallel to a horizontal plane. The negative temperature medium is still provided in a region where the magnetic field associated with each strip line is strong. The orientation of the applied steady magnetic field is adjusted for optimum operation.

It is to be understood that the various specific embodiments disclosed are merely illustrative of the general principles of the invention. In particular, various of the other forms of strip lines known in the art may be adapted by one skilled in the art for the practice of the invention. Moreover, with regard to those aspects of the invention which involve the use of a distributed slow wave circuit for increasing the transit time of travel in the negative temperature medium of either or both the signal power and the pumping power, various other forms of distributed slow wave circuits are feasible. Typical of such other forms is a helical conductor of the kind familiar for use as a distributed slow wave circuit in the traveling wave tube art.

What is claimed is:

In combination, means forming a negative temperature medium comprising a paramagnetic solid whose energy level system is characterized by three energy levels of which the separation between an adjacent pair corresponds to a signal microwave frequency and the separation between the nonadjacent pair corresponds to a different microwave frequency, a first distributed wave retarding means supplied with wave energy of said different microwave frequency for applying said wave energy to the negative temperature medium for establishing a negative temperature therein comprising a first succession of parallel strip conductors forming an array which extends in the direction of the longitudinal axis of the negative temperature medium, each conductor oriented at an acute angle with respect to the longitudinal axis of the negative temperature medium and having approximately one-half the wavelength of said different mircrowave frequency, and a second distributed wave retarding means supplied with signal energy for propagating the signal wave through the negative temperature medium for amplification comprising a second succession of parallel strip conductors forming an array which extends in the direction of the longitudinal axis of the negative temperature medium, each conductor oriented at an acute angle with respect to the longitudinal axis of the negative temperature medium and being approximately one-half the wavelength of the signal frequency.

References Cited in the file of this patent
UNITED STATES PATENTS

| | | |
|---|---|---|
| 2,545,871 | Bell | Mar. 20, 1951 |
| 2,663,797 | Cock | Dec. 22, 1953 |
| 2,743,322 | Pierce et al. | Apr. 24, 1956 |
| 2,755,447 | Engelmann | July 17, 1956 |
| 2,762,871 | Dicke | Sept. 11, 1956 |
| 2,825,765 | Marie | Mar. 4, 1958 |
| 2,836,722 | Dicke et al. | May 27, 1958 |
| 2,851,603 | Dicke | Sept. 9, 1958 |
| 2,851,652 | Dicke | Sept. 9, 1958 |
| 2,883,481 | Tien | Apr. 21, 1959 |

OTHER REFERENCES

I.R.E. "Transactions on Microwave Theory and Techniques," vol. MTT-3, March 1955, No. 2, pages 18, 38 and 168.

Bloembergen Physical Review, vol. 104, No. 2, October 15, 1956, pages 324–327.